United States Patent
Neufeld et al.

(10) Patent No.: US 7,149,814 B2
(45) Date of Patent: Dec. 12, 2006

(54) METHOD AND APPARATUS TO PROVIDE SOUND ON A REMOTE CONSOLE

(75) Inventors: E. David Neufeld, Magnolia, TX (US); Judy A. Neufeld, Magnolia, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 760 days.

(21) Appl. No.: 10/037,689

(22) Filed: Jan. 4, 2002

(65) Prior Publication Data

US 2003/0131065 A1 Jul. 10, 2003

(51) Int. Cl.
*G06F 15/16* (2006.01)
(52) U.S. Cl. ............... 709/248; 709/217; 709/220; 709/223; 709/224; 345/156; 715/500.1
(58) Field of Classification Search ............ 709/220, 709/221, 223, 227, 231, 217, 222, 250, 224, 709/248, 249; 714/37; 713/201; 710/22; 371/2, 98; 717/172; 345/156, 1.2; 704/208, 704/500; 381/56, 58; 715/500, 500.1
See application file for complete search history.

(56) References Cited

U.S. PATENT DOCUMENTS

| | | | | |
|---|---|---|---|---|
| 5,734,119 A * | 3/1998 | France et al. | ............ | 84/622 |
| 5,790,895 A | 8/1998 | Krontz et al. | ............ | 395/884 |
| 5,867,714 A * | 2/1999 | Todd et al. | ............ | 717/172 |
| 5,898,861 A | 4/1999 | Emerson et al. | ............ | 395/500 |
| 5,974,478 A * | 10/1999 | Wood et al. | ............ | 710/22 |
| 6,078,951 A * | 6/2000 | Pashupathy et al. | ............ | 709/217 |
| 6,098,098 A * | 8/2000 | Sandahl et al. | ............ | 709/221 |
| 6,185,617 B1 * | 2/2001 | Housel et al. | ............ | 709/227 |
| 6,321,348 B1 * | 11/2001 | Kobata | ............ | 714/37 |
| 6,490,627 B1 * | 12/2002 | Kalra et al. | ............ | 709/231 |
| 6,502,194 B1 * | 12/2002 | Berman et al. | ............ | 713/201 |
| 6,643,621 B1 * | 11/2003 | Dodrill et al. | ............ | 704/275 |
| 6,732,067 B1 * | 5/2004 | Powderly | ............ | 703/24 |
| 6,868,444 B1 * | 3/2005 | Kim et al. | ............ | 709/223 |
| 2002/0007255 A1 * | 1/2002 | Fujita et al. | ............ | 702/188 |
| 2002/0069272 A1 * | 6/2002 | Kim et al. | ............ | 709/221 |
| 2002/0133248 A1 * | 9/2002 | Fay et al. | ............ | 700/94 |
| 2002/0143975 A1 * | 10/2002 | Kimura et al. | ............ | 709/231 |
| 2002/0143978 A1 * | 10/2002 | Kuramochi et al. | ............ | 709/231 |
| 2002/0178295 A1 * | 11/2002 | Buczek et al. | ............ | 709/250 |
| 2002/0180775 A1 * | 12/2002 | Fado et al. | ............ | 345/727 |
| 2003/0061370 A1 * | 3/2003 | Nakayama et al. | ............ | 709/231 |
| 2003/0084133 A1 * | 5/2003 | Chan et al. | ............ | 709/222 |
| 2003/0131226 A1 * | 7/2003 | Spencer et al. | ............ | 713/100 |
| 2003/0200286 A1 * | 10/2003 | Barfurth et al. | ............ | 709/220 |

OTHER PUBLICATIONS

Emerson et al., "Operating System Independent Method and Apparatus for Graphical Remote Access," U.S. Appl. No. 09/438,253, filed Nov. 12, 1999.

(Continued)

*Primary Examiner*—ThuHa Nguyen

(57) ABSTRACT

A technique is provided for emulating sound of a remote computer system, such as a server, on another computer system interfacing with the remote computer system via a network. The technique emulates sound of the remote computer system by using a standard audio format or by copying audio settings of the remote computer system to the interfacing computer system. For example, the input/output addresses, sound tables, and register settings of audio circuitry for the remote computer system may be detected, copied, transferred, and used by audio circuitry for the interfacing computer system.

30 Claims, 6 Drawing Sheets

OTHER PUBLICATIONS

Emerson et al., "Video Eavesdropping and Reverse Assembly to Transmit Video Action to a Remote Console," U.S. Appl. No. 08/733,254, filed Oct. 18, 1996.

"Compaq Remote System Management for Industry-Standard Servers," Compaq Computer Corporation Technology Brief, Sep. 2001.

"Remote Server Management with Integrated Remote Console," Compaq Computer Corporation Technology Brief, Oct. 21, 1996.

* cited by examiner

METHOD AND APPARATUS TO PROVIDE SOUND ON A REMOTE CONSOLE

BACKGROUND OF THE INVENTION

1. Field of the Invention

The present technique relates generally to network computer systems, such as client-server computer systems. More particularly, a technique is provided for emulating sound of one network computer on a remote network computer.

2. Background of the Related Art

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Computer networks comprise a broad array of personal computers, servers, and network devices, which communicate with one another for sharing resources. Many of these network computers and devices require hardware configuration, software installation, and various other maintenance and management procedures. Network managers typically provide these management procedures on-site. However, the current trend is to provide more of these procedures via remote management tools, particularly for headless servers and network devices. Headless devices generally refer to devices lacking user interaction components, such as a monitor, a keyboard, and a mouse. Remote management tools are particularly useful for network management, because these remote tools improve repair efficiency and reduce equipment downtime for the various network components.

Remote management tools allow a user, such as a network manager, to interact remotely with another network computer or device via the network. For example, the remote user may interact with a server to initiate a boot process for the user's computer, to obtain a desired file from a file system on the remote server, or to execute a variety of other software applications. Servers often comprise a variety of network management hardware and software, such as Internet server hardware and software. Unfortunately, existing remote management tools provide very limited interaction with the network management hardware and software. For example, existing remote management tools do not provide sound corresponding to the network management hardware and software operating on the remote server. In many situations, the sound produced by the network management hardware and software may signal critical events or convey important information for effective use of the hardware and software.

Accordingly, the present technique addresses the foregoing problems by providing an interface capable of reproducing sound generated by a server's hardware and software on a remote device.

BRIEF DESCRIPTION OF THE DRAWINGS

Certain advantages of the invention may become apparent upon reading the following detailed description and upon reference to the drawings in which.

DESCRIPTION OF SPECIFIC EMBODIMENTS

Figure 1:
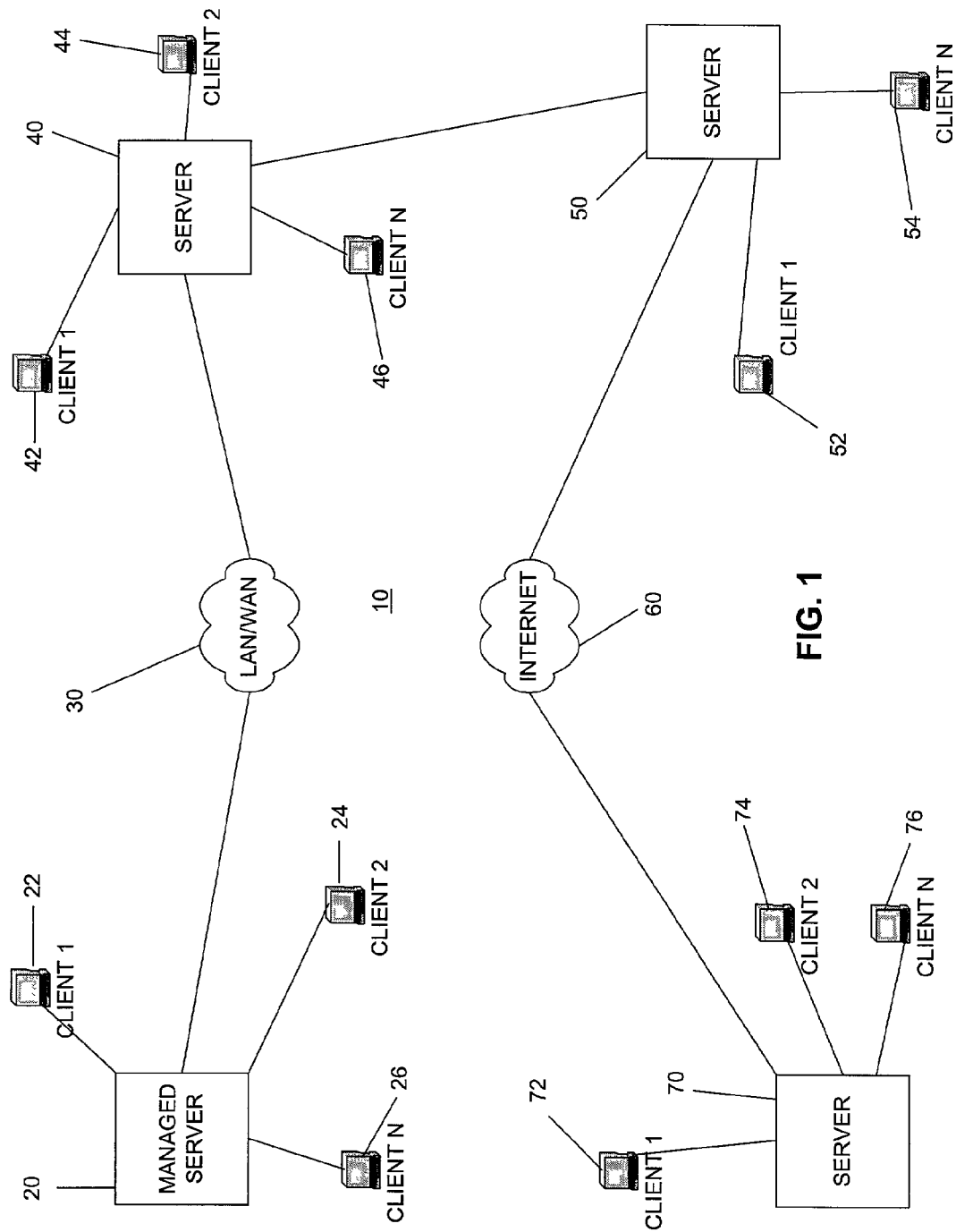
FIG. 1 is a block diagram illustrating an exemplary computer network system of client and server computers.

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

A technique is provided for emulating sound of a remote computer system, such as a server, on another computer system interfacing with the remote computer system via a network. The technique emulates sound of the remote computer system by using a standard audio format or by copying audio settings of the remote computer system to the interfacing computer system. For example, the input/output addresses, sound tables, and register settings of audio circuitry for the remote computer system may be detected, copied, transferred, and used by audio circuitry for the interfacing computer system.

As described in detail below, the present technique provides a variety of systems and methods for reproducing or emulating sound originating at a remote computer system, such as a server or network management device. Accordingly, the technique allows a user to interact with, or manage, the remote computer system with real-time audio corresponding to software and hardware events occurring on the remote computer system. For example, the user may remotely manage a web server via an interface that provides real-time video and audio corresponding to a management software application disposed on the web server. The present technique is also applicable in both directions between any number of computer systems, servers, or network devices. For example, the client computer system may transmit the user's voice to a server, which recognizes and processes the user's voice to control management hardware and software on the server. In response to these voice commands, the server may initiate a management function or execute some operation in which audio data is generated by the server. The present technique then transmits this audio data to the client computer system for analysis by the user. The present technique is applicable to a wide variety of remote control or management environments, hardware and software sharing environments, and other suitable network environments. Although the present technique is particularly well-suited for a client-server interaction, the following systems and methods for emulating or reproducing sound is equally applicable to interactions between any electronic or processor-based devices, such as desktop computers, laptop computers, personal digital assistants (PDAs), servers, headless servers, or any other desired system.

Turning now to the drawings and referring initially to FIG. 1, a block diagram of an exemplary computer network system in which the present invention may be practiced is illustrated and designated using a reference numeral 10. The computer network 10 is intended to illustrate a typical modem computer network configuration with all its complexities and flexibility. A managed server 20 is connected to a plurality of client computers 22, 24 and 26. For purposes of explaining the present embodiment clearly, only one server on the network 10 has been designated as a "managed server." In practice, those of skill in the art will appreciate that the any or all of the servers in the network 10 could simultaneously include hardware and software devised according to the invention, making those servers "managed servers."

The managed server 20 may be connected to as many as n different client computers. The magnitude of n is a function of the computing power of the managed server 20. If the managed server has large computing power (for example, faster processor(s) and/or more system memory) relative to other servers on the network, it will be able to serve a relatively large number of client computers effectively.

The managed server 20 is connected via a typical network infrastructure 30, which may include any combination of hubs, switches, routers and the like. While the network infrastructure 30 is illustrated as being either a local area network ("LAN") or wide area network ("WAN"), those skilled in the art will appreciate that the network infrastructure 30 may assume other forms such as a municipal area network ("MAN") or even the Internet.

The network infrastructure 30 connects the managed server 20 to server 40, which is representative of any other server in the network environment of managed server 20. The server 40 may be connected to a plurality of client computers 42, 44 and 46. The server 40 is additionally connected to server 50, which is in turn connected to client computers 52 and 54. The number of client computers connected to the servers 40 and 50 is dependent only on the computing power of the servers 40 and 50, respectively.

The server 40 is additionally connected to the Internet 60, which is in turn connected to a server 70. Server 70 is connected to a plurality of client computers 72, 74 and 76. As with the other servers shown in FIG. 1, server 70 may be connected to as many client computers as its computing power will allow.

Figure 2:
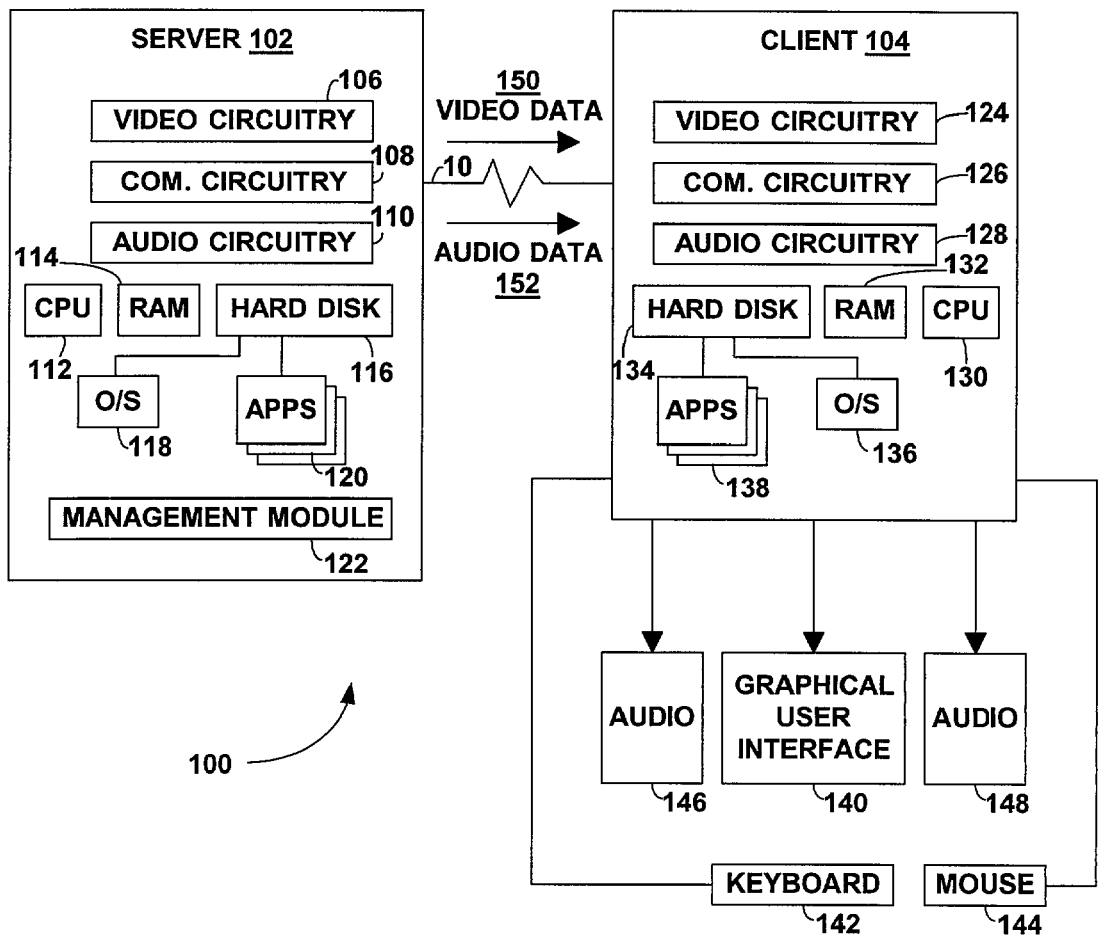
FIG. 2 is a block diagram illustrating an exemplary interface between the client computer and a managed server.

FIG. 2 illustrates an exemplary remote sound system 100 for reproducing sound generated at a server 102 remotely at a client 104 that is communicating with the server 102 through the network 10. Again, the remote sound system 100 is equally applicable to interactions between any type and number of devices. The server 102 and client 104 are provided simply for illustration purposes. As discussed in detail below, the remote sound system 100 operates to emulate or reproduce sound of a remote computer or device by copying audio settings (e.g., sound card registers) and sound files of the remote computer or by using a standard audio format. If audio settings are copied from the remote computer, then the audio circuitry of both computer systems is able to interpret audio commands the same or substantially the same. Similarly, if the system 100 processes an audio command, or audio data produced by an audio command, to provide a standard audio file/stream, then the audio circuitry of both computer systems is able to produce substantially identical sounds. In this exemplary embodiment, the server 102 comprises video circuitry 106, communication circuitry 108, audio circuitry 110, a central processing unit (CPU) 112, random access memory (RAM) 114, a hard disk drive 116, an operating system 118 disposed on the hard disk drive 116, software applications 120 disposed on the hard disk drive 116, and the management module 122.

The foregoing components may embody any suitable hardware and software for the desired server applications, such as client computer management, Web management, and "lights out" management (LOM) for headless servers and devices. For example, the software applications 120 may comprise various management applications having audio and video features, which the remote sound system 100 reproduces or emulates at the client 104. Moreover, the management module 122 may be a Remote Insight Lights-Out Edition board from Compaq Computer Corp., Houston, Tex. The LOM board provides Web browser access to networked devices, such as servers, through a seamless, hardware-based, OS-independent graphical remote console. The LOM board provides full control of hardware and operating systems of the remote networked device through the Web browser no matter where the client is located. Accordingly, the LOM board may be particularly well suited for use in a headless server, which generally lacks user interaction devices, such as a monitor, a keyboard, and a mouse.

The client 104 comprises a variety of hardware and software components, such as video circuitry 124, communication circuitry 126, audio circuitry 128, a central processing unit (CPU) 130, random access memory (RAM) 132, a hard disk drive 134, an operating system 136 disposed on the hard disk drive 134, and various software applications 138 disposed on the hard disk drive 134. The client 104 also comprises a variety of input/output devices, such as a graphical user interface 140, a keyboard 142, a mouse 144, and audio devices 146 and 148. In this exemplary embodiment, the graphical user interface 140 may comprise any suitable monitor or display. The audio devices 146 and 148 may embody audio speakers, a microphone, or any other desired audio devices.

As described in detail below, the remote sound system 100 facilitates remote interaction between the server 102 and the client 104 by transferring video data 150 and audio data 152 (e.g., audio commands or an audio file/stream) between the server 102 and the client 104. The system 100 then processes the video data 150 via the video circuitry 124 and displays the video data 150 on the graphical user interface 140 of the client 104. The system 100 also processes the audio data 152 via the audio circuitry 128 and plays the audio data 152 via one or both of the audio devices 146 and 148.

Figure 3:
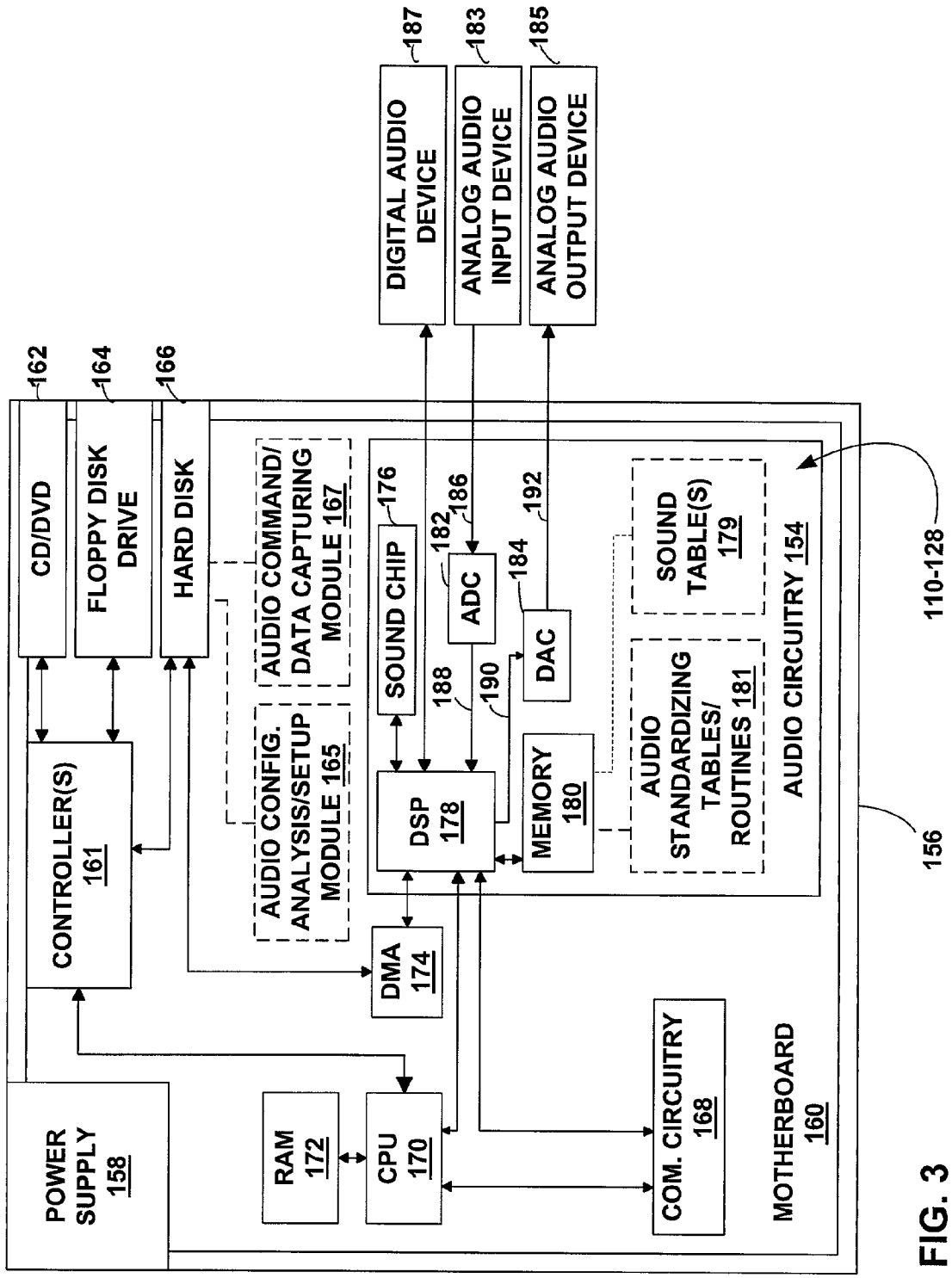
FIG. 3 is a block diagram of exemplary audio circuitry for the client computer or the managed server.

FIG. 3 is a block diagram illustrating exemplary audio circuitry 154, which may correspond to one or both of the audio circuitry 110 of the server 102 and the audio circuitry 128 of the client 104. As discussed in detail below, the configuration and sound data in this audio circuitry may be detected, copied, and emulated by any number of remote computer systems, thereby allowing audio commands or data generated at one of these remote computer systems to be produced substantially the same by the audio circuitry of the other computer systems. As illustrated, audio circuitry 154 is disposed in a device 156 (e.g., server 102 or client 104), which comprises a power supply 158, a motherboard 160, and a plurality of hardware components powered by the power supply 158 and intercoupled via the motherboard 160. The hardware components comprise a CD/DVD drive 162, a floppy disk drive 164, a hard disk drive 166, one or more controllers 161 for the drives 162 through 166, communication circuitry 168 (e.g., a modem, a network card, etc.), a central processing unit (CPU) 170, random access memory (RAM) 172, a direct memory access (DMA) controller 174, and the audio circuitry 154. Depending on the particular application, the server 102 and the client 104 may comprise any of the foregoing or other desired hardware and software components.

In this exemplary embodiment, the audio circuitry 154 comprises a sound chip 176, a digital signal processor (DSP) 178, memory 180 (e.g., ROM), an analog-to-digital converter (ADC) 182, and a digital-to-analog converter (DAC) 184. The memory 180 also stores a variety of sound files, configuration parameters, and sound synthesis data, such as sound tables 179 and audio data standardizing tables/routines 181. The sound tables 179 may comprise sound tables for a variety of sound synthesis techniques, such as Wavetable synthesis and FM synthesis. The audio data standardizing tables/routines 181 may comprise data, parameters, mathematical functions, conversion programs, processing routines, and audio circuitry analysis programs for converting audio data or commands into a desired analog or digital audio format, such as an .MP3, .WAV, or RealAudio file.

In operation, the analog-to-digital converter (ADC) 182 converts an analog audio signal 186, such as sound generated from a microphone 183, into a digital format 188 for processing by the digital signal processor 178. The digital-to-analog converter (DAC) 184 converts a digital signal 190 into an analog signal 192 for audio playback via speakers 185. The digital signal 190 may originate from the CD/DVD drive 162, software stored on the hard disk drive 166, an external digital audio device 187, or any other signal passing through the digital signal processor 178. The digital signal processor (DSP) 178 processes a digitized sound signal by using various sound tables 179, register settings 193 (see FIG. 3), and audio configurations on the sound chip 176 and memory 180. The digital signal processor 178 then feeds the processed signal to the computer's data bus by way of the direct memory access (DMA) controller 174 or the central processing unit (CPU) 170. The audio circuitry 154 also may use the processing resources of the central processing unit (CPU) 170. For example, the DSP 178 may transmit a digital sound signal to the CPU 170, which processes the digital sound signal and routes the digitized sound data to the hard disk drive 166. Alternatively, the DSP 178 may communicate directly with the hard disk drive 166 via the DMA controller 174.

The communication circuitry 168 also may transmit an audio command or audio data to a remote device, such as transmission between the server 102 and the client 104. As discussed in further detail below, the device 156 may comprise a variety of hardware and software programs for detecting and analyzing audio configurations and settings of the audio circuitry 154. For example, an audio configuration analysis/setup module 165 may be stored on the hard disk 166 for evaluating the audio circuitry 154, copying the sound tables 179 and the register settings of the sound chip 176, and then using these copied audio settings to configure audio circuitry of the remote device. In this exemplary embodiment, the audio configuration analysis/setup module 165 may be resident in both the server audio circuitry 110 and the client audio circuitry 128. Moreover, the remote device (e.g., the client 104) may transmit the audio configuration analysis/setup module 165 to the device 156 for analysis of the audio circuitry 154 and retrieval of its audio settings. The remote device then configures its own audio circuitry (e.g., the audio circuitry 128 of the client 104) based on the retrieved audio settings from the audio circuitry 154 (e.g., the audio circuitry 110 of the server 102). If the computer systems have identical audio circuitry (e.g., identical registers), then the present technique configures the audio circuitry the same. However, if the computer systems have different audio circuitry (e.g., different registers), then the present technique may attempt to provide a substantially identical or similar audio configuration for the different audio circuitry. For example, the configuration analysis/setup module 165 may evaluate the differences between the devices, copy the essential settings from the device 156, and configure the remote device accordingly.

In operation, the audio circuitry of both computer systems interprets the audio command in substantially the same way to produce substantially the same audio output. For example, the digital signal processor (DSP) 178 or the central processing unit (CPU) 170 may process an audio command from one of the hardware or software components of the device 156, and then transmit the audio command to the remote device via the communication circuitry 168 (e.g., from the server 102 to the client 104). The remote device then produces substantially the same audio output based on the audio command, because both computer systems have substantially the same settings for the audio circuitry. An audio command/data capturing module 167 also may be stored on the hard disk 166 for capturing an audio command intended for the audio circuitry 154, copying the audio command, and then transmitting the audio command to the remote device via the communication circuitry 168. As with the audio configuration analysis/setup module 165, the remote device (e.g., the client 104) may transmit the audio command/data capturing module 167 to the device 156 to facilitate the audio interface between the device 156 and the remote device.

The communication circuitry 168 also may transmit audio data to the remote device in the form of a standard audio file or audio stream. For example, the device 156 may use the audio data standardizing tables/routines 181 of the audio circuitry 154 to produce a standard audio file or stream, such as an MP3, WAV, or RealAudio file/stream. Accordingly, as the hardware and software of the device 156 commands the audio circuitry 154 to produce a sound, the device 156 may generate and transmit a standard audio file or stream to the remote device for substantially identical sound output.

Figure 4:
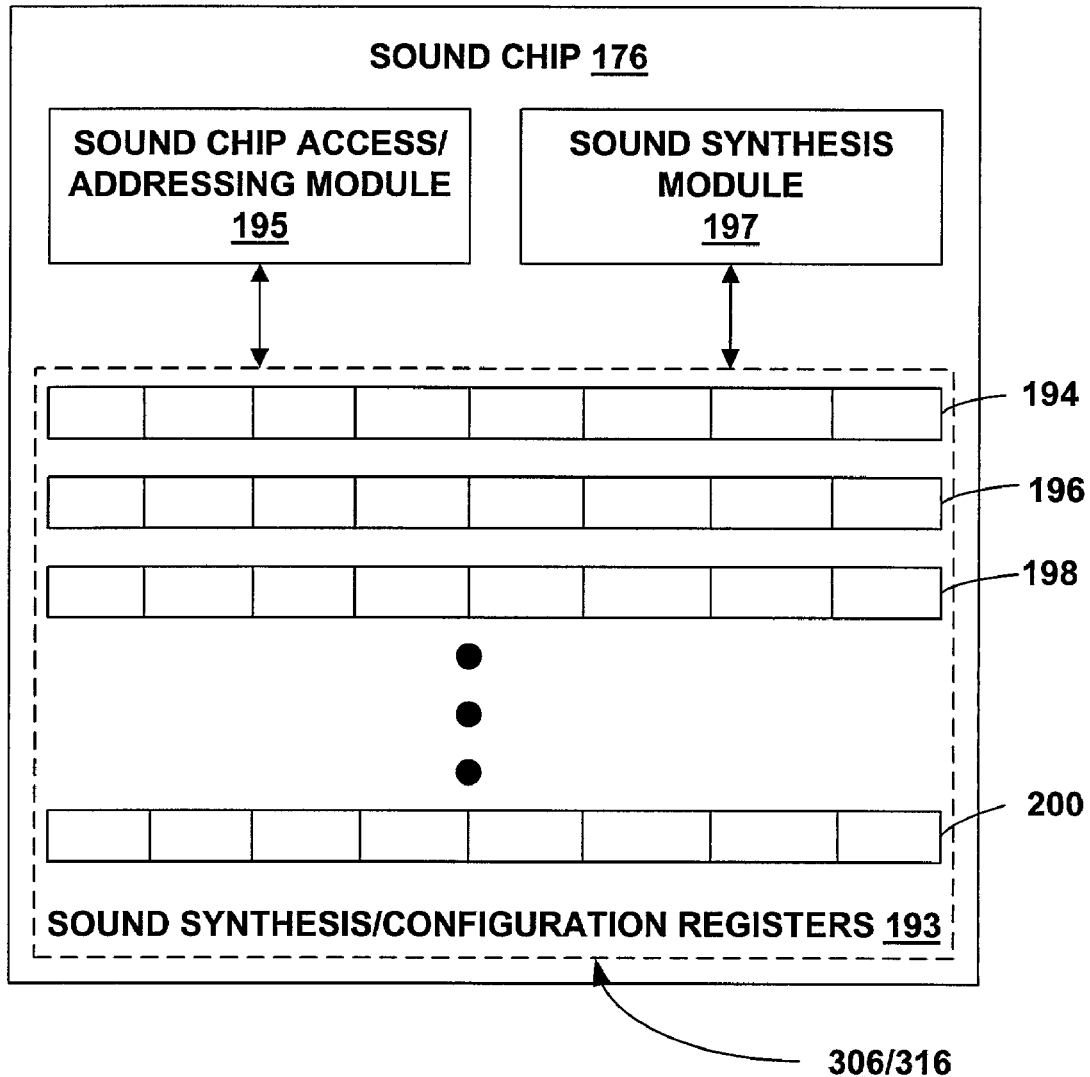
FIG. 4 is a block diagram of registers on an exemplary sound chip for the audio circuitry.

As noted above, the sound chip 176 and memory 180 of the audio circuitry 154 may comprise a variety of registers, sound tables, and/or other audio configurations. The present technique may use these register settings, sound tables, and other audio configurations to provide an audio interface between two or more computer systems. As illustrated in FIG. 4, the sound chip 176 may comprise a plurality of registers 193, such as the 8-bit registers 194, 196, 198 and 200, which may be resident on both the server 102 and the client 104 (see FIG. 5). For example, an exemplary sound card may have 224 registers. The sound chip 176 also may comprise a sound chip access/addressing module 195 (e.g., I/O addressing for registers) and a sound synthesis module 197, such as an FM synthesis or Wavetable synthesis module. FM synthesis takes tones of varying frequencies and combines them to create an approximation of a particular sound, such as the beat of a drum, the blare of a trumpet, or the sound of a piano. Wavetable synthesis operates by recording a sample of the actual instrument and then playing that sample in a loop to re-create the sound of the original instrument. Accordingly, by configuring multiple remote computer systems with identical or substantially the same audio configurations, the audio data generated at one of these computer systems can be efficiently transferred and interpreted by another one of the multiple remote computer systems. In this manner, the present technique facilitates real-time audio interaction between multiple computer systems.

In any of the foregoing sound systems, the audio circuitry 154 may comprise a variety of registers 193, sound tables 176, and other settings for processing and controlling the sound. For example, the registers 193 may comprise a variety of FM synthesis registers, which may correspond to timers, control flags, speech synthesis modes, composite sine-wave speech synthesis modes, keyboard split point, amplitude modulation (AM), vibrato (Vib), analog generator type, keyboard scaling rate, modulator frequency multiple, level key scaling, attack and decay rates, sustain level, release rate, feedback algorithms, amplitude modulation depth, vibrato depth, rhythm, waveform select, and various other audio settings and configurations. For example, registers 194 through 200 may comprise bits for the following parameters:

TABLE 1

| | | | Register 194 | | | | | |
|---|---|---|---|---|---|---|---|---|
| BIT | 7 | 6 | 5 | 4 | 3 | 2 | 1 | 0 |
| PARAMETER | Attack Rate | | | | Decay Rate | | | |

TABLE 2

| | | | Register 196 | | | | | |
|---|---|---|---|---|---|---|---|---|
| BIT | 7 | 6 | 5 | 4 | 3 | 2 | 1 | 0 |
| PARAMETER | Sustain Level | | | | Release Time | | | |

TABLE 3

| | | | Register 198 | | | | | |
|---|---|---|---|---|---|---|---|---|
| BIT | 7 | 6 | 5 | 4 | 3 | 2 | 1 | 0 |
| PARAMETER | AM | Vib | | | Octave Shift | | | |

TABLE 4

| | | | Register 200 | | | | | |
|---|---|---|---|---|---|---|---|---|
| BIT | 7 | 6 | 5 | 4 | 3 | 2 | 1 | 0 |
| PARAMETER | Scaling | | | | Output Level | | | |

The present technique configures the audio circuitry 154 by programming the various registers 194 through 200 to values suitable for re-creating the desired sound. Accordingly, the present technique may detect the type of audio circuitry on each of the multiple remote computer systems, determine if there is compatibility between the foregoing audio configurations, and proceed to program audio circuitry for one or more of the multiple remote computer systems. If the audio circuitry for the multiple systems is identical (e.g., identical type and number of registers, memory for sound tables, etc.), then the present technique provides an identical audio interface for the multiple systems. However, if there are differences in the register settings, the memory resources, and other features of the audio circuitry, then the present technique attempts to copy the essential settings and provide a substantially identical audio setup for the multiple systems. For example, the present technique may utilize sound card conversion tables or programs (e.g., tables/routines 181) to ensure a proper audio match between the registers 193, sound tables 176, and other settings of audio circuitry for the multiple remote computer systems.

The audio circuitry 154 also has a variety of input/output addresses and communication channels, such as an interrupt request number (IRQ), an 8-bit DMA channel, a 16-bit DMA channel, and a sound chip input/output address. Moreover, the sound chip 176 may comprise multiple sound systems, such as an FM synthesizer and a wave synthesizer. Accordingly, the system 100 may configure and interact with the audio circuitry 154 on various remote devices, such as the server 102 and the client 104, using the foregoing input/output addresses and communication channels.

Figure 5:
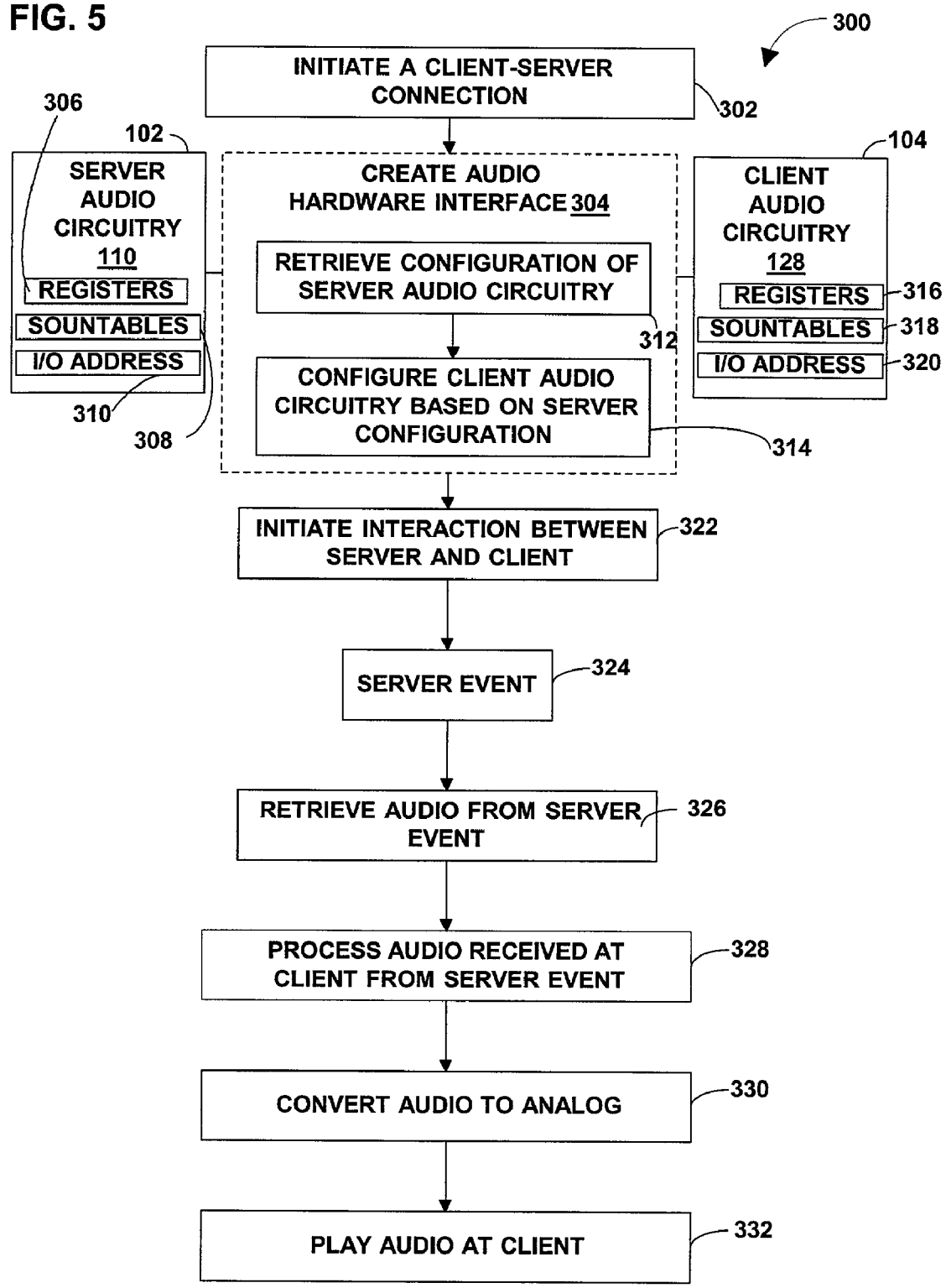
FIGS. 5 and 6 are flowcharts of exemplary remote sound processes for reproducing sound of the managed server at the client computer.

FIG. 5 is a flow chart of an exemplary process 300 for practicing the present technique. As illustrated, the process 300 begins by initiating a client/server connection (block 302) between the server 102 and the client 104. The process 300 then proceeds to create an audio interface between audio circuitry of the server 102 and the client 104 (block 304). As discussed above, the audio circuitry 154, which may correspond to the audio circuitry 110 of the server 102 or the audio circuitry 128 of the client 104, comprises a variety of registers 193, sound tables 179, and input output addresses that control sound and operation of the audio circuitry 154. In this exemplary embodiment, the process 300 proceeds to retrieve the configuration settings of the server audio circuitry 110, which comprises various registers 306 (e.g., registers 193), sound tables 308 (e.g., sound tables 179), and input/output addresses 310 (block 312). The process 300 then creates the audio interface 304 by configuring the client audio circuitry 128 based on the server configuration (block 314). For example, the process 300 may evaluate the server audio circuitry 110, determine the register settings of the registers 306, copy the sound tables 308, detect the input/output addresses 310, and transmit these various audio configurations and data from the server 102 to the client 104. Once received by the client 104, the process 300 configures registers 316 based on the configuration of registers 306, copies the sound tables 308 to sound tables 318, and configures the client audio circuitry 128 for communication of audio commands or audio streams via input/output addresses 320. The process 300 also may detect whether the client and server audio boards are compatible, and provide conversion routines and sound conversion tables (e.g., tables/routines 181) for creating an audio interface between these audio boards.

The process 300 then proceeds to interact between the server 102 and the client 104 (block 322). For example, the process 300 may initiate a remote management session between the server 102 and the client 104, allowing the client 104 to manage network resources via the management module 122, as illustrated in FIG. 2. During this remote management session, the client 104 may interact with one of the hardware modules or software applications 120 disposed on the server 102. At some point, either by the user's interaction with the server 102 or by independent operation of the server 102, a server event 324 may occur. In this exemplary embodiment, the process 300 retrieves an audio command/data corresponding to the server event (block 326). For example, the process 300 copies the audio command being transmitted to, or generated by, the server audio circuitry 110 and transmits the copied audio command to the client audio circuitry 128, which has been configured with substantially identical or similar settings as the server audio circuitry 110 (i.e., settings of the registers, sound tables, etc.). Accordingly, the client audio circuitry 128 processes the audio command received from the server 102 at the client 104 based on these substantially identical or similar settings (block 328). The client audio circuitry 128 then generates audio data based on the audio command and converts the server's audio data to an analog signal (block 330). The client audio circuitry 128 then plays the analog audio data at the client 104 (332). Accordingly, the process 300 provides a real-time audio output at the client 104 corresponding to the audio command directed to the server 102, thereby facilitating real-time user interaction with the server 102.

Figure 6:
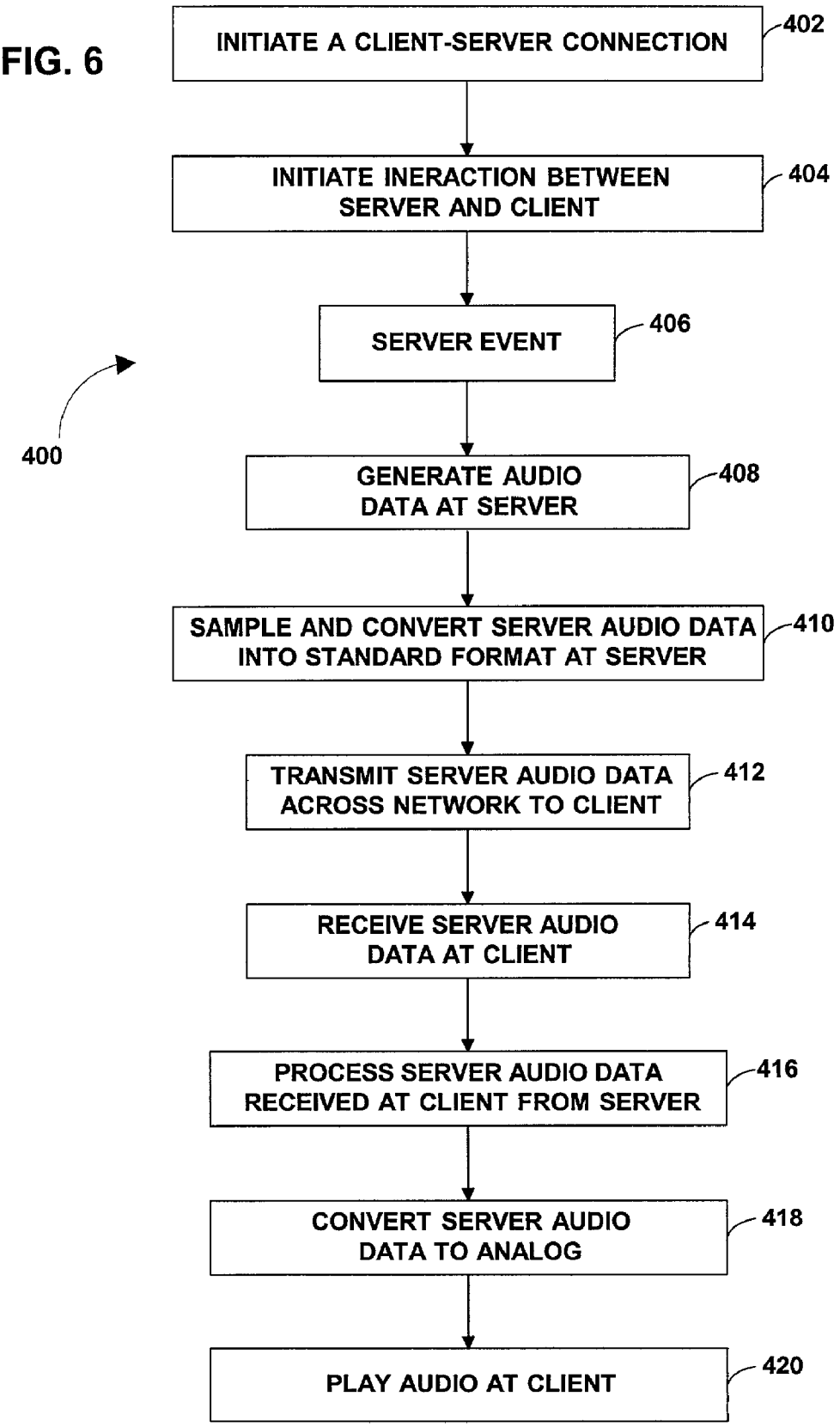

Although the foregoing process 300 is particularly advantageous for emulating sound on a remote computer system, such as the client 104, the present technique also may provide remote sound via hardware-independent techniques. FIG. 6 is a flow chart of an exemplary process 400 for transmitting sound generated at the server 102 to the client 104 using sound processing techniques, which provide a standard sound format interpretable by both the audio circuitry 110 of the server 102 and the audio circuitry 128 of the client 104. Accordingly, the process 400 proceeds by initiating a client/server connection (block 402) and by initiating interaction between the server 102 and the client 104 (block 404). For example, the process 400 may initiate a remote management session between the server 102 and the client 104, allowing the client 104 to manage network resources via the management module 122, as illustrated in FIG. 2. During this remote management session, the client 104 may interact with one of the software applications 120 disposed on the server 102.

At some point, either by the user's interaction with the server 102 or by independent operation of the server 102, a server event 406 may occur. In this exemplary embodiment, the process 400 generates audio data at the server 102 corresponding to the server event (block 408). The process 400 then samples and converts the server audio data into a standard audio format (block 410). For example, the server 102 may process and save the server audio as any one of the following audio formats: AU, AIFF, AIFF-C, Audio CD, IFF/8SVX, MIME, MOD, MP#, Quicktime, SDII, snd Resource types 1 and 2, SoundCap, SoundEdit 16, Voc, Wave (.wav), and RealAudio. The process 400 then transmits the server audio and data across the network 10 to the client 104 (block 412). The client 104 receives the server audio data in the standard audio format (block 414), which the client 104 is able to process for replay at the client 104 (block 416). The process 400 then converts the server audio data to an analog signal (block 418), which the client 104 plays to provide a full audio and video interface between the server 102 and the client 104 (block 420). The process 400 also may use a variety of audio streaming and real time technologies (RTT), such as RealAudio, thereby allowing the client 104 to read, process and play the audio stream (i.e., audio for the server event) as it is received by the client 104.

Accordingly, the present technique facilitates real-time user interaction with a remote computer system, such as a server, by providing real-time audio corresponding to hardware and software events, software audio, music, and various other audio associated with managing the remote computer system. Moreover, the present technique may allow audio communication in both directions, thereby allowing voice recognition software to be used for commanding or interacting with the remote computer system. The present technique also may comprise a variety of other audio analysis modules configured to provide an efficient audio interface between remote network devices, such as the server 102 and the client 104. For example, the present technique may comprise an audio circuitry analysis module (e.g., audio configuration analysis/setup module 165), which proceeds with audio data standardization if the audio boards are incompatible or if conflicts exist between the client and server hardware. Moreover, the present technique may select one of the foregoing systems 300 and 400 based on the type of remote session between the server 102 and the client 104. For example, a short or simple session may proceed with the audio data standardization technique of the process 400, rather than the hardware emulation technique of the process 300.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims. For example, the present technique may detect, copy, and substantially emulate a wide variety of audio hardware and software, including FM synthesizers, Wave synthesizers, and various other sound synthesizers. Moreover, the present technique may utilize any standard audio format, including but not limited to, WAV files, MP3 files, RealAudio files, etc.

What is claimed is:

1. A method for providing sound between a remote computer system and an interfacing computer system, comprising:

audibly interfacing with a computer management module disposed on the remote computer system from the interfacing computer system via a network comprising:
detecting audio settings of the remote computer system;
transmitting the audio settings to the interfacing computer system via a network;
configuring audio circuitry of the interfacing computer system based on the audio settings to provide an audio interface between the interfacing computer system and the computer management module;
capturing audio data responsive to software or hardware events occurring on the remote computer system;
transmitting the audio data from the remote computer system to the interfacing computer system;
processing the audio data via the audio circuitry based on the audio settings of the remote computer system to produce substantially identically sounds originating at the remote computer system; and
converting the audio data to an analog signal at the interfacing computer system:
graphically interfacing with the computer management module disposed on the remote computer system from the interfacing computer system via the network to enable user management via the computer management module in response to the software or hardware events.

2. The method of claim 1, wherein detecting audio settings of the remote computer system comprises detecting settings of audio input/output registers.

3. The method of claim 1, wherein detecting audio settings of the remote computer system comprises detecting settings of sound synthesis registers.

4. The method of claim 1, wherein detecting audio settings of the remote computer system comprises detecting sound tables.

5. The method of claim 1, comprising copying audio settings corresponding to sound synthesizer registers and sound tables.

6. The method of claim 1, wherein configuring audio circuitry comprises:
programming registers of the audio circuitry to at least partially match register settings of the remote computer system; and
storing sound tables of the remote computer system at the interfacing computer system.

7. The method of claim 1, comprising:
capturing an audio command generated at the remote computer system;
transmitting the audio command to the interfacing computer system; and
processing the audio command via the audio circuitry based on the audio settings of the remote computer system.

8. The method of claim 7, comprising playing the audio data at the interfacing computer system for a remote event occurring on the remote computer system.

9. The method of claim 1, comprising transmitting sound data in both directions between the remote computer system and the interfacing computer system.

10. The method of claim 1, wherein the computer management module comprises software, hardware, or a combination thereof.

11. The method of claim 1, comprising transmitting voice audio data from the interfacing computer system to the remote computer system to control the management module via voice recognition software.

12. A method for providing sound between a remote computer system and an interfacing computer system, comprising:
detecting audio settings of a remote computer system;
transmitting the audio settings to the interfacing computer system via a network;
configuring audio circuitry of the interfacing computer system based on the audio settings detected on the remote computer system and the interfacing comouter system;
detecting audio data generated at the remote computer system in response to a system event;
processing and converting the audio data into a desired audio format at the remote computer system;
transmitting the audio data to an the interfacing computer system via a the network;
interpreting and playing the audio data with the audio circuitry at the interfacing computer system for interaction with the system event with substantially identical sounds at the interfacing computer system relative to the remote computer system;
displaying on the interfacing computer system a graphical user interface linked with a computer management module disposed on the remote computer system to enable remote management of the remote computer system in response to the system event; and
directing the computer management module on the remote computer system to control the system event from the interfacing computer system.

13. The method of claim 12, comprising:
detecting video data generated at the remote computer system;
transmitting the video data to the interfacing computer system via the network; and
displaying the video data at the interfacing computer system.

14. The method of claim 12, wherein detecting audio data comprises capturing audio data directed to audio circuitry of the remote computer system.

15. The method of claim 12, comprising remotely managing the remote computer system via the interfacing computer system.

16. The method of claim 15, wherein remotely managing the remote computer system comprises interacting with a network management module disposed on the remote computer system.

17. The method of claim 12, comprising transmitting voice command data from the interfacing computer system to the remote computer system to enable voice based control of the remote computer system.

18. The method of claim 12, wherein the computer management module comprises software, hardware, or a combination thereof.

19. A system for interacting with a remote computer system, comprising:
an audio configuration analysis module adapted to identify and copy audio settings of the remote computer system;
an audio configuration setup module adapted to configure audio circuitry of an interfacing computer system based on the audio settings;
an audio capturing module adapted to capture audio data responsive to a system event occurring on the remote computer system;
a transmission module adapted to transmit the audio data from the remote computer system to the interfacing computer system;
a processing module adapted to process the audio data via the audio circuitry based on the audio settings of the remote computer system to produce substantially identical sounds originating at the remote computer system;
converter adapted to convert the audio data to an analoa signal at the interfacing comDuter system;
a computer management module disposed on the remote computer system and adapted to provide real-time interaction between the remote computer system and the interfacing computer system; and
a graphical user interface adapted to link the interfacing computer system with the computer management module disposed on the remote computer system, wherein the graphical user interface includes functions to respond to the system event indicated by sound originating on the remote computer system and emulated on the interfacing computer system.

20. The system of claim 19, wherein the audio settings comprise register settings of audio registers for the remote computer system.

21. The system of claim 19, wherein the audio settings comprise sound card access addresses for the remote computer system.

22. The system of claim 19, wherein the audio settings comprise sound tables for sound synthesis at the remote computer system.

23. The system of claim 19, wherein the remote computer system comprises a lights out management module for managing network resources.

24. The system of claim 19, wherein the remote computer system and the interfacing computer system both comprise sound synthesis registers and sound tables.

25. The system of claim 24, wherein the audio configuration analysis module and the audio configuration setup module are adapted to emulate interaction between the remote computer system and audio circuitry of the remote computer system.

26. The system of claim 19, wherein the computer management module comprises software, hardware, or a combination thereof.

27. The system of claim 19, wherein the computer management module comprises a voice recognition application adapted to receive voice audio data from the interfacing computer system and respond to voice commands receives via a voice audio data.

28. A method for providing sound from a remote computer system to an interfacing computer system, comprising:
   detecting audio settings of the remote computer system;
   transmitting the audio settings to the interfacing computer system via a network, wherein the interfacing computer system is adapted to:
      configure audio circuitry of the interfacing computer system based on the audio settings to provide an audio interface between the interfacing computer and the remote computer system;
   capturing audio data responsive to software or hardware events occurring on the remote computer system;
   transmitting the audio data from the remote computer system to the interfacing computer system, wherein the interfacing computer system is adapted to:
      process the audio data via the audio circuitry based on the audio settings of the remote computer system to produce substantially identical sounds originating at the remote computer system on the interfacing computer system; and
      convert the audio data to an analog signal at the interfacing computer system; and
   providing a graphical interface with a computer management module disposed on the remote computer system to the interfacing computer system via the network to enable user management via the computer management module in response to the software or hardware events.

29. The method of claim 28, comprising receiving an interface request at the remote computer system from the interfacing computer system.

30. The method of claim 29, comprising responding to the interface request by at least transmitting the audio settings of the remote computer system to the interfacing computer system via the network.

* * * * *

UNITED STATES PATENT AND TRADEMARK OFFICE
CERTIFICATE OF CORRECTION

PATENT NO. : 7,149,814 B2  Page 1 of 1
APPLICATION NO. : 10/037689
DATED : December 12, 2006
INVENTOR(S) : E. David Neufeld et al.

It is certified that error appears in the above-identified patent and that said Letters Patent is hereby corrected as shown below:

In column 10, line 56, in Claim 1, delete "system:" and insert -- system; --, therefor.

In column 11, line 44, in Claim 12, delete "comouter" and insert -- computer --, therefor.

In column 11, line 50, in Claim 12, after "data to" delete "an".

In column 11, line 51, in Claim 12, after "via" delete "a".

In column 12, line 40, in Claim 19, delete "analoa" and insert -- analog --, therefor.

In column 12, line 41, in Claim 19, delete "comDuter" and insert -- computer --, therefor.

Signed and Sealed this

Twenty-fourth Day of March, 2009

JOHN DOLL
*Acting Director of the United States Patent and Trademark Office*